United States Patent
Kopetz

(10) Patent No.: US 10,306,015 B2
(45) Date of Patent: May 28, 2019

(54) METHOD FOR PERIODICALLY MEASURING DATA IN A REAL TIME COMPUTER SYSTEM AND REAL-TIME COMPUTER SYSTEM

(71) Applicant: FTS COMPUTERTECHNIK GMBH, Vienna (AT)

(72) Inventor: Hermann Kopetz, Baden (AT)

(73) Assignee: TTTech Computertechnik AG, Vienna (AT)

( * ) Notice: Subject to any disclaimer, the term of this patent is extended or adjusted under 35 U.S.C. 154(b) by 98 days.

(21) Appl. No.: 15/377,585

(22) Filed: Dec. 13, 2016

(65) Prior Publication Data
US 2017/0171350 A1    Jun. 15, 2017

(30) Foreign Application Priority Data
Dec. 14, 2015   (AT) ................ A 51060/2015

(51) Int. Cl.
*H04L 29/08* (2006.01)
*H04J 3/06* (2006.01)
(Continued)

(52) U.S. Cl.
CPC .......... *H04L 67/325* (2013.01); *H04J 3/0635* (2013.01); *H04L 12/417* (2013.01); *H04L 12/44* (2013.01); *H04L 43/0852* (2013.01)

(58) Field of Classification Search
CPC ..... H04L 67/325; H04L 12/44; H04L 12/417; H04L 43/0852; H04J 3/063
See application file for complete search history.

(56) References Cited

U.S. PATENT DOCUMENTS

2003/0061004 A1*  3/2003  Discenzo ............ G05B 13/024
                                                    702/182
2015/0120803 A1   4/2015  Angelow et al.
(Continued)

FOREIGN PATENT DOCUMENTS

WO      2012/130241 A1    10/2012

OTHER PUBLICATIONS

Austrian Search Report for AT Application No. 51060/2015 dated Nov. 30, 2016 (1 page).

*Primary Examiner* — Hassan Kizou
*Assistant Examiner* — Hector Reyes
(74) *Attorney, Agent, or Firm* — Eversheds Sutherland (US) LLP

(57) ABSTRACT

A method is provided for the periodic detecting of measured values in a distributed real-time computer system, which comprises a plurality of intelligent sensors, node computers, and distribution units, wherein the intelligent sensors, the node computers, and the distribution units have access to a global time, wherein real-time data is transported in the real-time computer system by time-triggered real-time messages, wherein periodically recurring global observation instants are established or will be established in the real-time computer system at the beginning of a frame, wherein each node computer controlling a physical sensor outputs a trigger signal to the the physical sensor at a sensor-specific trigger instant of the sensor controlled by the node computer, which specific trigger instant is calculated from the difference between the global observation instant and a sensor-specific startup interval.

12 Claims, 1 Drawing Sheet

Figure 1:
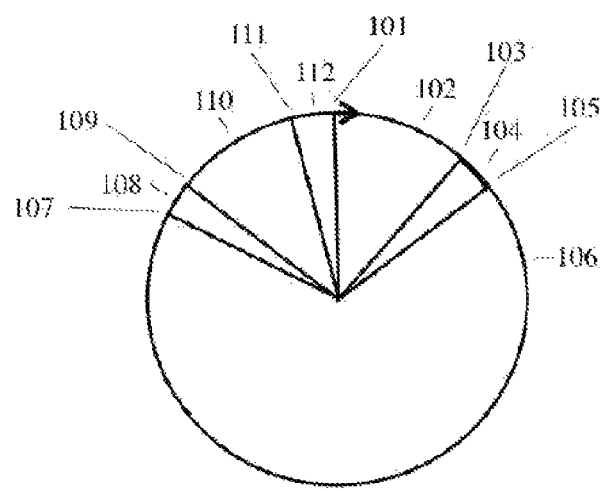

(51) Int. Cl.
*H04L 12/26* (2006.01)
*H04L 12/417* (2006.01)
*H04L 12/44* (2006.01)

(56) References Cited

U.S. PATENT DOCUMENTS

2015/0236869 A1* 8/2015 Vreeland ............... H04L 12/403
                                                          370/254
2016/0104265 A1   4/2016 Poledna et al.
2017/0171350 A1* 6/2017 Kopetz ................. H04J 3/0635

* cited by examiner

METHOD FOR PERIODICALLY MEASURING DATA IN A REAL TIME COMPUTER SYSTEM AND REAL-TIME COMPUTER SYSTEM

The invention concerns a method for the periodic detecting of measured values in a real-time computer system, especially a distributed real-time computer system, which real-time computer system, especially a distributed real-time computer system, comprises a plurality of sensors, especially intelligent sensors, node computers and distribution units, wherein the sensors, especially intelligent sensors, the node computers and the distribution units have access to a global time, and wherein real-time data is transported in the real-time computer system by means of time-triggered real-time messages.

Moreover, the invention concerns a real-time computer system, especially a distributed real-time computer system, which real-time computer system comprises a plurality of sensors, especially intelligent sensors, node computers and distribution units, wherein the sensors, especially intelligent sensors, node computers and distribution units, wherein the sensors, especially intelligent sensors, node computers and distribution units have access to a global time, and wherein real-time data is transported in the real-time computer system by means of time-triggered real-time messages.

A distributed real-time computer system comprises a plurality of sensors and actuators, which exchange messages through distribution units with a plurality of node computer, which undertake the processing of data.

A distributed real-time computer system is time-triggered when the periodically recurring moment of time at which a message is to be sent by a transmitter is determined by the progression of a global time. A time-triggered real-time computer system presupposes that the sensors and actuators, the node computers and the distribution units have access to a global time of known accuracy.

In a time-triggered real-time computer system there is a strict separation between communication and data processing. In a time-triggered distributed real-time computer the communication occurs predominantly through time-triggered state messages, whose sending times and receiving times are contained in a timetable or timetables created a priori.

The access semantics for the data of a time-triggered state message corresponds largely to the access semantics for a variable in a programming language. During reading by a reception process, the current value of the state message is provided. Upon arrival of a new state message, the old value is overwritten. A precise description of the access semantics of state messages will be found in [1].

A Cyber-Physical System (CPS) consists of a physical system, which is controlled by a preferably distributed real-time computer system. The physical processes in the system must be synchronized with the computing processes in the real-time computer system. The physical processes in the system can be controlled by the computing processes in the distributed real-time computer system.

A distributed real-time computer system as described above consists for example of a process periphery for observation and control of the physical processes in the system, a plurality of node computers with application software for the processing of the data which occurs, and a communication system with communication channels and distribution units for the transport of real-time messages between the process periphery and the node computers.

The process periphery consists of sensors, especially intelligent sensors and preferably actuators, especially intelligent actuators.

An intelligent sensor is a device which first transforms the process data being detected into a bit pattern. This bit pattern is checked for plausibility in the course of the preprocessing and transformed into a physical measured value. Next, the measured value is sent in a message to receivers, especially the interested receivers.

An intelligent actuator is a device which transforms a nominal value received in a message at a predetermined time into a physical quantity and thereby influences the physical process in the physical system.

While the progression of the physical process in the system, or system process, depends on the progression of the real-time computer system, the computer process is determined by the speed of working off the program in the real-time computer system.

One method of synchronizing the system process with the computer processes is based on the introduction of equidistant periodic synchronization points. It is advantageous for the physical process to be observed at each synchronization point by means of all available physical sensors at the same time. The simultaneous observation of all process data ensures that time-related changes in the process occurrence do not falsify the relations existing at the observation time between the observed process data.

The time interval between two consecutive synchronization points is known as a frame. The duration of a frame is determined by the dynamics of the physical process in the system. By dynamics of a physical process is meant the maximum value of the derivative of a variable or variables V describing the process with respect to the time t.

In the design phase of the real-time computer system the duration D of a frame should be chosen such that even in the extreme case of the greatest dynamics of the physical process the change D. Max /dV/dt / of a continuous process variable within a frame has no major influence on the stated problem.

The choice of the duration of a frame shall be explained on the example of an airbag triggering system in a motor vehicle. If a vehicle is moving at a speed of 30 m/s (that is, 108 km/h), its position will change by 3 cm in a time interval of 1 ms. If a frame duration of 100 µs is chosen, the position change of 3 mm within a frame has no major influence on the process occurrence.

In a strict frame-based system there are no inputs of a physical process to a computer process during the duration of a frame. In such a time-triggered distributed computer system there is only one significant global interrupt signal, the system-wide synchronized periodic clock interrupt, which signals the beginning of a new frame. IN a strict frame-based system the computer processes run during the duration of a frame uninfluenced by the physical processes in the system.

In a strict frame-based system, different sensors observe the physical process solely at established globally synchronized observation times. In general, the observation times are synchronized with the beginning times of a frame.

One problem which the invention proposes to solve is to indicate a solution how to detect sensor data synchronously at periodically recurring observation times in a real-time computer system, especially a distributed real-time computer system.

This problem is solved with the above mentioned method and real-time computer system, especially a distributed real-time computer system, in that according to the invention periodically recurring global observation times are established or will be established, especially system-wide, in the real-time computer system, and wherein each node computer controlling a sensor, especially a physical sensor, puts out a trigger signal to the sensor, especially the physical sensor, at a sensor-specific trigger time of the sensor controlled by the node computer, which specific trigger time is calculated from the difference between the global observation time minus a sensor-specific startup interval.

In particular, one can accomplish in this way that different sensors, especially different physical sensors, which might have startup intervals of different length, nonetheless perform their observation at the same global observation time.

Advantageous embodiment of the method according to the invention and the computer system according to the invention, especially a distributed real-time computer system, which can be realized in themselves or in any desired combination, are listed below:

in the event that environment information has less dynamics than raw sensor data, a node computer controlling a sensor will calculate from the raw sensor data a requested measured value at the observation time taking into account environment information, especially that detected previously, or in the event that environment information has the same or a greater dynamics than raw sensor data a node computer controlling a sensor will wait for the arrival of messages with environment information from other sources and calculate the requested measured value taking into account such environment information which was detected at substantially the same time as the raw sensor data;

in the event that a sensor, especially an intelligent sensor, producing a measured value, has failed, this measured value will be calculated on the basis of known laws of nature between the available measured values;

measured values are transmitted in time-triggered state messages;

the communications protocol used for the time-triggered message transmission is TTEThernet.

The invention shall be explained more closely below with the aid of the drawing. This shows FIG. 1 a typical sequence of events within a time-triggered frame, and FIG. 2 describes the dynamic behavior of the detection process of an intelligent sensor.

FIG. 1 shows a typical sequence of events within a time-triggered frame. At the observation time 101, the beginning of a frame, which also marks the global synchronization time, the physical process is observed by all sensors at the same time. In the time interval 102, the preprocessing interval, the sensor data is read out and preprocessed. At the time 103, the delivery time, the sending of the message containing the preprocessed sensor data begins. After the transmission interval 104 specified in the timetable, at time 105 the message arrives at the receiving node computer, which calculates the nominal values in the time interval 106. At the time 107 this node computer begins sending the message with the nominal values to the intelligent actuator. After the transmission interval 108 this message arrives at the time 109 at a preferably intelligent actuator, which after the delay interval 110 hands over the nominal values to the physical system at the time 111.

In the time interval 112, the interval between the completion 111 of the calculation in this frame and the beginning of the next frame 101, the internal state of the system is unambiguously defined.

In what follows, a clear distinction shall be drawn between the term information and the term data. Information is a statement about the state of things or constructs in the world. Data is patterns, bit patterns in cyberspace, which is detected predominantly by a physical sensor at a moment of time. The information which a physical sensor provides results from the triplet {data, time of data detection and explanation of the data} [2]. We shall call this triplet {data, time of data detection and explanation of the data} an observation. A measured value is an observation of the physical system.

A physical sensor is a device which detects a chosen aspect of the physical state of its immediate surroundings and generates, depending on its design, raw sensor data (bit patterns). From the raw sensor data, the explanation as to the design of the sensor, and additional information as to the measurement surroundings, the desired measured values of the detected physical state variables can be derived. The representation of a measured value is determined by the given context. For example, one represents the measured value of temperature in Europe in degrees Celsius, while in the USA it is in degrees Fahrenheit.

The combination of a physical sensor with a node computer, which processes the raw sensor data and determines the requested measured values, which are packaged in sensor messages and sent via a computer network for further processing to other node computers, is called an intelligent sensor. Intelligent sensors are often available on the market as compact components with an interface to a standardized real-time communication system. In the following, for simplicity it shall be assumed that all sensors are intelligent sensors.

Figure 2:
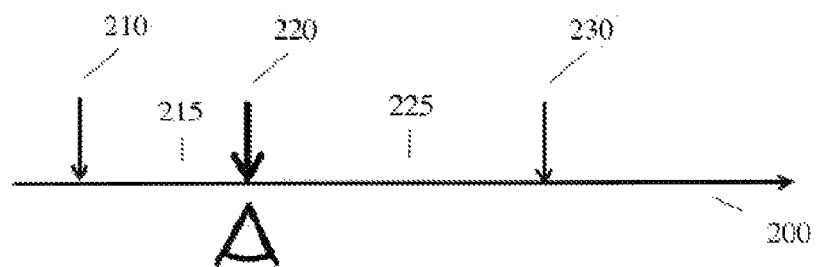

FIG. 2 describes the dynamic behavior of the detection process of a sensor, especially an intelligent sensor, which can be characterized substantially by three moments of time. On the abscissa 200 of FIG. 2 is plotted the progression of the global time. At the trigger time 210 the detection process of the sensor is started, especially the physical sensor, by the node computer associated with it and controlling it, by executing a trigger signal. At the observation time 220 the chosen state of the environment is observed. At the a priori established delivery time 240 the detected measured values are handed over to the time-triggered communication system for transport to the other node computers.

The time interval between the trigger time 210 and the observation time 220 is called the startup interval 215. The time interval between the observation time 220 and the delivery time 230 is called the preprocessing interval 225. The durations of the startup interval 215 and the preprocessing interval 225 are determined by the design of a sensor. In general, different sensors have different startup and preprocessing intervals.

The sensor-specific trigger time 210 results from the difference between the (global) observation time 220 minus the sensor-specific startup interval 215.

Due to the sensor-specific duration of the preprocessing interval 225, the different sensors may have different delivery times 230, even though the physical process has been observed at the same observation time 220. These different delivery times have to be taken into account in the a priori established timetables for the time-triggered messages.

In many cases an intelligent sensor needs, in addition to the raw sensor data, current environment information in order to be able to determine the desired measured value.

For example, a barometric altitude measurement requires, besides the measured air pressure, environment information on the current air pressure at sea level and the current temperature, in order to be able to determine the intended measured value at the measurement site, the altitude above sea level. The current air pressure at sea level, which has relatively slight dynamics, can be detected from an external source, such as a weather station, via the Internet.

The current environment information can be detected in various ways:
1) Supplementing of the intelligent sensor with additional physical sensors in order to detect the current environment information directly at the same time as the observation time. This variant is economically costly, since each intelligent sensor needs to comprise a plurality of physical sensors.
2) Receiving of messages in which the current environment information at the observation time is furnished by other intelligent sensors or external sources. This variant has the benefit that the environment information in the entire real-time computer system only needs to be detected once, yet it has the drawback that the measured values can only be delivered with a delay.
3) Use of environment information that has been detected prior to that of the observation time. This variant has the benefit that the measured values can be delivered without delay, but the drawback that the raw sensor data and the environment information are detected at different moments of time.

In the context of the invention it can be provided that, in the event that the environment information has less dynamics than the raw sensor data, the node computer controlling the physical sensor will calculate from the raw sensor data the measured value at the observation time taking into account especially previously detected environment information. In the event that the environment information has the same or a greater dynamics than the raw sensor data the node computer controlling the sensor will wait for the arrival of the environment information from other node computers and calculate the intended measured value taking into account this environment information which was detected at the same time as the raw sensor data.

In many real-time applications there exists an implicit redundancy of the measured values, which is produced by known laws of nature between the measurement data detected by different sensors at an observation time. By making use of these laws of nature, it is possible in these real-time applications to verify the consistency of the measured values detected at an observation time and if necessary replace missing measured values with calculated measured values.

CITED LITERATURE

[1] Kopetz, H. Real-Time Systems, *Design Principles for Distributed Embedded Applications*. Springer Verlag. 2011.

[2] Kopetz, H. *A Conceptual Model for the Information Transfer in Systems-of-Systems*. Proc. of ISORC 2014. pp. 17-24. IEEE Press. 2014.

The invention claimed is:
1. A method for the periodic detecting of measured values in a distributed real-time computer system comprising a plurality of intelligent sensors, node computers, and distribution units in communication with one another, wherein the intelligent sensors, the node computers, and the distribution units have access to a global time, and wherein real-time data is transported in the distributed real-time computer system by time-triggered real-time messages, the method comprising:

establishing periodically recurring global observation instants (220) in the distributed real-time computer system; and outputting from each node computer controlling the intelligent sensor, a trigger signal to the intelligent sensor, at a sensor-specific trigger instant (210) of the intelligent sensor controlled by the node computer, wherein the sensor-specific trigger instant (210) is calculated from the difference between the global observation instant (220) and a sensor specific startup interval (215) of the intelligent sensor.

2. The method of claim 1, wherein, in the event that environment information has less dynamics than raw sensor data, a node computer controlling the intelligent sensor will calculate from the raw sensor data a requested measured value at the observation instant taking into account environment information.

3. The method of claim 1, wherein, in the event that environment information has the same or a greater dynamics than raw sensor data, a node computer controlling the intelligent sensor will wait for the arrival of messages with environment information from other sources and calculate the requested measured value taking into account such environment information which was detected at substantially the same instant as the raw sensor data.

4. The method of claim 1, wherein, in the event that the intelligent sensor, producing a measured value, has failed, this measured value will be calculated on the basis of known laws of nature between available measured values.

5. The method of claim 1, wherein the measured values of the distributed real-time computer system are transmitted in time-triggered state messages.

6. The method of claim 1, wherein a communications protocol used for time-triggered message transmission in the distributed real-time computer system is TTEthernet.

7. A distributed real-time computer system, comprising:
a plurality of intelligent sensors;
node computers; and
distribution units,
wherein the intelligent sensors, the node computers, and the distribution units are in communication with one another and have access to a global time,
wherein real-time data is transported in the distributed real-time computer system by time-controlled real-time messages,
wherein periodically recurring global observation instants (220) are established for the periodic detection of measured values in the distributed real-time computer system at the beginning of a frame, and wherein each node computer controlling a intelligent sensor puts out a trigger signal to the intelligent sensor at a sensor-specific trigger instant (210) of the intelligent sensor controlled by the node computer, which specific trigger instant (210) is calculated from the difference between the global observation instant (220) and a sensor-specific startup interval of the intelligent sensor.

8. The real-time computer system of claim 7, which is configured such that in the event that environment information has less dynamics than raw sensor data, a node computer controlling the intelligent sensor will calculate from the raw sensor data a requested measured value at the observation time-instant taking into account environment information.

9. The real-time computer system of claim 7, which is configured such that in the event that environment information has the same or a greater dynamics than raw sensor data a node computer controlling at intelligent sensor will wait for the arrival of messages with environment information from other sources and calculate the requested measured value taking into account such environment information which was detected at substantially the same instant as the raw sensor data.

10. The real-time computer system of claim 7, which is configured such that in the event that the intelligent sensor, producing a measured value, has failed, this measured value will be calculated on the basis of known laws of nature between available measured values.

11. The real-time computer system of claim 7, wherein the measured values of the distributed real-time computer system are transmitted in time-triggered state messages.

12. The real-time computer system of claim 7, wherein the communications protocol used for the time-triggered message transmission in the distributed real-time computer system is TTEthernet.

* * * * *